Sept. 15, 1964

J. W. HICKS, JR.

3,148,967

PROCESS FOR MAKING OPTICAL IMAGE TRANSFER DEVICE

Filed Feb. 24, 1958

INVENTOR
JOHN W. HICKS, JR.
BY
Louis L. Gagnon
ATTORNEY

Sept. 15, 1964   J. W. HICKS, JR   3,148,967
PROCESS FOR MAKING OPTICAL IMAGE TRANSFER DEVICE
Filed Feb. 24, 1958   2 Sheets-Sheet 2
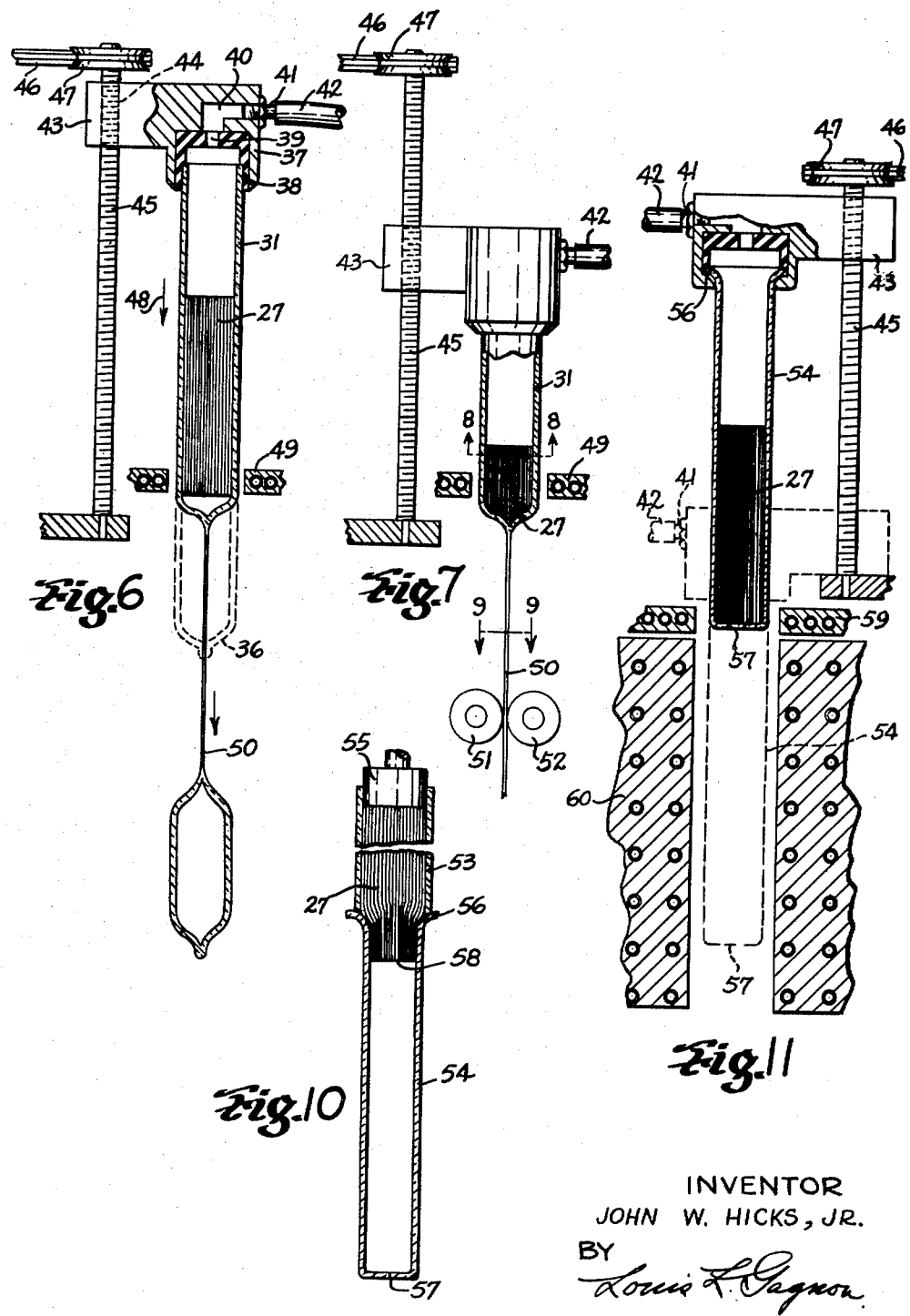
INVENTOR
JOHN W. HICKS, JR.
BY
Louis L. Gagnon
ATTORNEY United States Patent Office 3,148,967
Patented Sept. 15, 1964

3,148,967
PROCESS FOR MAKING OPTICAL IMAGE
TRANSFER DEVICE
John W. Hicks, Jr., Fiskdale, Mass., assignor to American Optical Company, Southbridge, Mass., a voluntary association of Massachusetts
Filed Feb. 24, 1958, Ser. No. 717,035
8 Claims. (Cl. 65—4)

This invention relates to an improved method of manufacture of optical image transfer devices of the type comprising a very large number of small, elongated, light-conducting fibers or filaments arranged in side-by-side, bunched relation to each other so as to collectively provide light-accepting and light-emitting areas of appreciable sizes at the opposite ends of the device, said method being directed more particularly to the coating of the individual rods of glass of a relatively high index of refraction with an outer layer of glass of a relatively low index of refraction and which may thereafter be drawn down to fibers of high index glass of relatively small diameter having thin coatings of low index glass thereon, the said fibers thereafter being grouped in side-by-side, bunched relation with each other within a support for retaining them in said relation and which, during the fusing of said fibers with each other, will collapse on and force said fibers into intimate engagement with each other and will fuse therewith and retain them in the finished cross-sectional shape desired.

The primary object of this invention is to provide a method of supporting and fusing together a plurality or bundle of rods or fibers of glass of relatively high index of refraction, each having a coating or cladding of low index glass thereon wherein the means for supporting said clad rods or fibers is in the form of a tube of glass similar to the glass of the cladding and in which the clad rods or fibers are placed in relatively intimate side-by-side relation with each other and with the casing being thereafter heated and caused to collapse upon the clad rods or fibers to cause them to assume a more intimate contact with each other and to fuse with each other and with the tube of glass at a temperature lower than would normally be required for bringing about said fusion.

Another object is to provide a method wherein the glass rods and glass casing assembly may, after fusion, be drawn down to a smaller diameter depending upon the intended use of the ultimate device.

Another object is to provide, in a method such as set forth above, a glass casing or envelope having at one end thereof means for causing the ends of the clad rods or fibers to assume an end aligned relation with each other.

Another object is to provide, in a method of the above nature, vacuum suction in communicating relation with the upper end of the glass tube or envelope to cause internal atmospheric gases, as well as adsorbed gases, from the inner surfaces of the respective glasses to be evacuated during the fusing operation and which vacuum evacuation will cause the glass casing or envelope to collapse on the clad rods or fibers with a force sufficient to insure a more intimate side-by-side contact and fused relation of said clad rods or fibers with each other.

Other objects and advantages of the invention will become apparent from the following description taken in connection with the accompanying drawings wherein:

FIGS. 2, 3, 4, 5, 6 and 7 are diagrammatic side sectional views illustrating different steps in the method of manufacture;

FIGS. 10 and 11 are diagrammatic side sectional views of a modified form of the invention.

Figure 1:
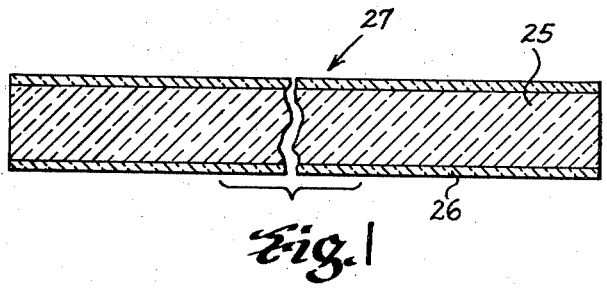
FIG. 1 is a greatly enlarged sectional view of a glass rod of high index of refraction having a coating or cladding of glass of a low index of refraction thereon and from which the coated fibers used in the present invention may be obtained.

Referring to the drawings wherein like characters of reference designate like parts throughout the several views, the invention is directed particularly to the use of a plurality of coated or clad rods, filaments or fibers 27 which will hereinafter be referred to as fibers such as shown by the greatly enlarged sectional view of FIG. 1. The said fibers 27 preferably comprise an inner core 25 of high index flint glass or the like having a coating or cladding 26 of low index crown glass or the like. The coated or clad fibers 27 may be formed by extruding the high index glass 25 in the form of a rod and simultaneously extruding the low index glass along with the high index glass through suitable extrusion orifices from tanks containing said respective glasses in order to provide the desired resultant coated rods or the high index glass may be initially formed in the shape of rods and dipped into molten low index glass in order to provide the coating or cladding on said rods. Another manner in which the coatings or claddings may be placed on the high index rods 25 is by placing the high index glass 25 in rod form internally of a tubular member of low index glass and thereafter causing said tubular member 26 to collapse on and fuse with the high index rod.

In all the above instances, the high index glass is initially formed in the shape of a rod having the low index coating or cladding thereon and is thereafter drawn down to filament or fiber size wherein the said fibers are used in accordance with the teachings of the present invention.

Figure 2:
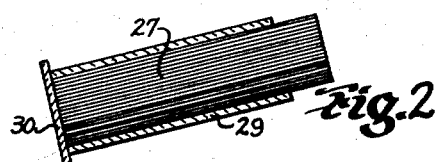

The coated fibers, as set forth above in one embodiment of the invention, are placed in close, side-by-side relation with each other internally of a glass tube 29 of a controlled diameter selected in accordance with the diameter desired of the finished device. The tube has a removable closure member 30 attached to one end thereof and is preferably supported in a tilted position, as diagrammatically illustrated in FIG. 2, whereby the fibers may be positioned in relatively tightly packed relation internally of the said glass tubular member 29 with the inner ends thereof engaging the closure member 30. To assist in causing the fibers to assume a relatively intimate fit with each other during said packing in said glass tube, the said tube may be vibrated either manually, mechanically, electrically, or otherwise to cause said fibers to assume a more closely fitted relation with each other.

Figures 3, 4, 5:
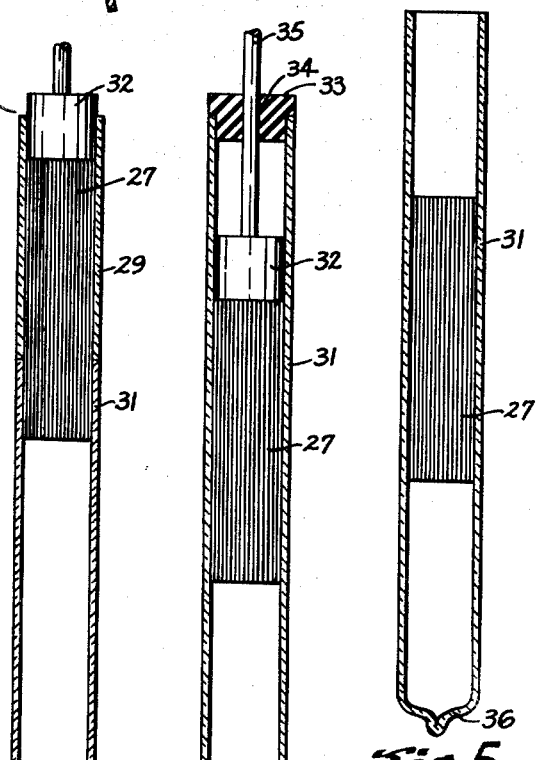

The end plate 30 is then removed from the glass tube 29 and the said tube is placed in end-to-end relation with a tubular envelope 31 of glass which is substantially the same as the glass 20 of the coatings or claddings on the high index fibers. The envelope 31 preferably has substantially the same melting point as said cladding glass 20 and substantially the same co-efficient of expansion. If desired, the said co-efficient of expansion may be a little lower than that of the cladding glass 20. A suitable plunger 32 is forced inwardly of the glass tubing 29 to cause the clad fibers 27 to be forced inwardly of the glass envelope 31. When the said clad fibers are located internally of the glass envelope 31, as shown diagrammatically in FIG. 4, a guide plug 33 having an opening 34 therein is positioned inwardly of the end of the tubular envelope and the opening 34 therein acts as a guide for the rod 35 of the plunger 32. This is to insure that the clad fibers will be forced inwardly of said envelope 31 the desired amount and with the ends thereof in substantially parallel relation with each other and to aid in preventing breakage of the glass envelope during the insertion of fibers.

After the fibers have been properly inserted in the envelope, the guide plug 33 and the plunger 32 are removed from the glass envelope 31. It is pointed out that the glass tube 31 is much longer and extends outwardly of the inner ends of the clad fibers so as to have a portion protruding considerably below said fibers, the intent and purpose of which will be defined in more detail hereinafter. The end of the glass envelope 31, as diagrammatically illustrated at 36, may be heat sealed or may be provided with a suitable stopper or the like. The glass envelope having the clad fibers therein is then positioned within a holder 37 having a suitable rubber stopper or the like 38 surrounding the upper end of the glass envelope 31, as shown in FIG. 6. The stopper has an opening 39 in communicating relation with a passageway 40 internally of the holder 37 and which, in turn, communicates with a stem 41 to which a vacuum line 42 is connected.

The holder 37 is provided with a portion 43 having a threaded bore 44 therein and which is connected with a threaded rod 45. The rod 45 is rotated by a suitable belt and pulley drive 46 and 47 or other suitable drive means for imparting a rotary movement thereto. The said threaded rod 45 is rotated in a direction whereby it will cause the envelope 31 to move at a controlled speed in a downward direction as indicated by the arrow 48. The lower end of the glass envelope 31 is lowered through a suitable heater 49 wherein the protruding portion having the sealed end 36 will be first heated and softened by an amount whereby it may be manually gripped and drawn downwardly into a small rod 50 which is hereinafter used as a lead for drawing the section of the glass envelope containing the coated or clad fibers downwardly to the diametrical size desired. This is diagrammatically illustrated in FIG. 7 wherein the rod portion 50 is directed through suitable drawing rollers 51 and 52 whose speed of rotation is controlled to be of an amount in excess of the speed of rotation of the threaded rod 45 whereby a constant continuous pulling action will be imparted on the glass envelope 31 and coated or clad rods 27 internally thereof as they pass through the heating unit 49 whereby they will be drawn downwardly to the diametrical size desired.

Figure 8:
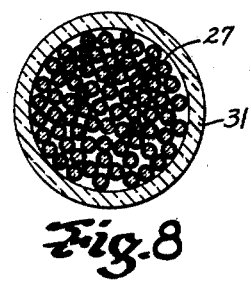
FIG. 8 is an enlarged cross-sectional view taken on line 8—8 of FIG. 7 and looking in the direction indicated by the arrows.
Figure 9:
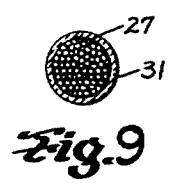
FIG. 9 is an enlarged cross sectional view taken as on line 9—9 of FIG. 7.

It is pointed out that the temperature of the heating unit is so controlled as to enable the above result to be obtained and is of a temperature sufficient to cause the coatings or claddings on the glass fibers to fuse with each other and simultaneously cause the glass of the envelope to fuse with the contiguous coatings or claddings. Simultaneous to this drawing, the vacuum created in the vacuum line 42 is constantly drawing or sucking out the internal atmospheric gases, as well as the adsorbed gases, from the inner respective glasses. This is to insure that there will be no trapped air or gas in between the fused rods. The related position of the coated fibers internally of the glass envelope 31 is diagrammatically illustrated in cross-section in FIG. 8. A similar cross-section is illustrated in FIG. 9 wherein it will be noted that the coated fibers and the glass envelope are of a much smaller diameter after having been drawn down as mentioned above.

The vacuum, during the heating and drawing down of the glass envelope 31, also causes the said glass envelope to collapse with greater pressure on the coated fibers whereby they will be caused to assume a more intimate side-by-side contact with each other and will enable the said glass coatings or claddings and the glass envelope to fuse with each other at a temperature much lower than would normally be required to bring about such fusing. This more positively insures that the fibers retain a more uniform shape during the drawing operation.

The above-described process is that of intimately packing and supporting the clad high index fibers internally of the casing or envelope 31 and thereafter drawing said casing and glass fibers down to a smaller desired diameter in a more uniform manner and without trapping air or other gases between the fused surfaces. However, in making an assembly adapted particularly for use as tube faces for cathode ray tubes or the like, the coated fibers may be initially placed within a glass loading tube 53 similar to the loading tube 29 and may be thereafter forced outwardly of said loaded tube internally of a glass envelope 54 similar to the envelope 31 by a plunger such as diagrammatically illustrated at 55. In this instance, however, the glass envelope 54 has a flared end 56 and is initially of an internal diameter smaller than the internal diameter of the loading tube 53 and further has a relatively flat sealed end 57 on its lower end. The loading tube having the clad fibers therein is placed in aligned relation with the flared end 56, and the plunger 55 then forces the clad fibers downwardly into the glass envelope 54 until the lower ends 58 of said clad fibers engage the lower sealed end wall 57 of the glass envelope 54. In this instance, the glass envelope is of a glass having substantially the same melting point as the coating or cladding glass on the fibers and has substantially the same or a slightly lower co-efficient of expansion similar to that of the glass envelope 31.

The glass envelope 54, as diagrammatically illustrated in FIG. 11, is supported in a manner similar to the glass envelope 31, as illustrated in FIG. 6, and is lowered in a similar manner through a heating unit 59 which is of a temperature sufficient to cause the glass envelope 54 to soften and collapse, in response to the pull of the vacuum onto the coated or clad fibers 27 internally thereof and to cause said clad fibers to assume an intimate side-by-side fitted relation with each other and to fuse with each other while simultaneously causing the glass of the enevlope to fuse with said coatings or claddings engaged thereby. The speed of lowering the glas envelope 54 having the coated or clad fibers therein through the heating unit is controlled so that there will be little change in the longitudinal dimensions of said casing and coated glass fibers.

An annealing chamber 60 is located immediately beneath the heating unit wherein the fused fibers and glass envelope may be annealed. The annealing zone is of a length sufficient to contain the entire length of the envelope having the coated or clad fibers therein and the temperature thereof is controlled according to the particular glasses used.

With the first defined method the coated or clad fibers 27 may be formed of glass rods of flint glass having an index of refraction ranging from 1.57 to 1.80 combined with a coating or clad glass having a lower index of refraction ranging from 1.48 to 1.57, with the lower index clad glasses being used with the lower index flint rods as a combination, and as the index or refraction of the flint glass used for the rods is increased then the index refraction of the coating or clad glass is accordingly increased.

The temperature of the heating unit employed in softening and drawing the glass envelope containing the coated rods downwardly to a smaller diameter will be from between 1200° F. to 1600° F., depending upon the related melting points of the glasses used. In the final product the rod should be drawn down to filaments of coated fibers ranging in size from .0001 to .0005 with the final coatings or claddings being of from ½ to 2 microns in thickness.

The annealing temperature used in the modified method wherein the glass envelope is merely collapsed on the rods without any drawing is approximately 1000° F. or less depending upon the particular glasses used and the temperature of heating the glass envelope 54 to cause it to collapse and to cause said glass envelope and the coatings or claddings to fuse with each other is of an amount sufficient to bring about this fusing without causing the assembly to be further drawn down in size. In instances when annealing is required, it is preferable to anneal with two different temperatures, one which will bring about the proper annealing of the glass envelope 54 and the other which will bring about the proper annealing of the coatings or claddings on the filaments. After having been formed, either as shown in FIG. 11 or by drawing down as shown in FIG. 7, the assembly is then cut to the lengths or thicknesses desired depending upon the particular use to which the devices are to be put.

While certain specific methods have been shown and described for packing the rods internally of the glass casings or envelopes, it is to be understood that several different methods may be employed to bring about the same end result. These steps of the method shown and described, therefore, are by way of illustration only, as the essence of the invention is that of initially packing the coated rods or fibers internally of a glass casing or envelope whereby they will be positively supported during the collapsing and fusing of the casing and the coatings of the rods and further throughout the drawing of the casing and glass fibers down to a small diameter, the collapsing of the glass casing being such as to cause the coated fibers to assume a more intimate side-by-side fitted relation with each other simultaneous to the fusing thereof and thereby enable a lower fusing temperature to be used than would be possible if no such pressure were imparted on said coated fibers.

It is further pointed out that while the glass envelopes 31 and 54 have been defined as being transparent, it is preferable in some instances to form said envelopes or casings of opaque glass and of any desired index of refraction. However, the melting temperature and co-efficient of expansion of said casings should approach those of the cladding glasses on the rods or fibers in a manner similar to the previously described casings.

It is further pointed out that the rods or fibers 27 may be placed directly within the casing 31 if desired, in which instance the said casing 31 might be supported at an angle and vibrated such as is defined in connection with the use of the tubular member 29.

It is further to be understood that while certain temperature ranges have been given for the softening and fusing of the glasses recited herein, that other glasses might be used and in which instance might require higher or lower temperatures in accordance with the known characteristics of such glasses. Technical information is available which gives the temperatures of softening, melting and annealing of said commercial glasses, all of which may be used in the present invention. The various specific temperatures, therefore, are not set forth herein.

The invention, therefore, is not to be limited to the specific apparatus and intermediate steps of the method shown and described as they are given only by way of illustration.

Having described my invention, I claim:

1. The method of making a fiber optical image transfer device comprising bundling a plurality of elongated relatively thin glass coated glass light-conducting fibers together in tightly packed side-by-side substantially parallel aligned congruent distributional arrangement and with corresponding opposite ends of said fibers in substantially flush relation with each other, forcing said bundle of fibers endwise into the open end of a tight fitting glass tubular member having its opposite end hermetically sealed while maintaining said fibers in said aligned and congruent relation with each other, continually evacuating air and gasses from within said tubular member through said open end thereof while simultaneously moving the assembly of said fibers and tubular member beginning at said sealed end thereof through a heating zone to cause the cross section of said assembly disposed within said zone to be heated and softened to an extent wherein the tubular member and fibers as a whole become deformable and the vacuum within said tubular member will cause said tubular member to collapse into intimate surrounding relation with said fibers and force the same together into intimate interfitting cross-sectional shapes thereby causing said fibers and tubular member to fuse together into an integral mass and continuing said movement of said assembly into said heating zone substantially throughout the length of said bundle of fibers therein to continuously and progressively bring about said collapsing and fusing of said tubular member and fibers.

2. The method of making a fiber optical image transfer device comprising forming a tightly packed bundle of a plurality of elongated relatively thin glass light-conducting fibers placed in side-by-side parallel aligned congruent distributional arrangement with corresponding opposite ends thereof in substantially flush relation with each other, said fibers each having a glass core of relatively high index of refraction and a surrounding relatively thin coating of glass of relatively low index of refraction, forcing said bundle into a tight fitting open-ended glass tubular member while maintaining said fibers in said aligned and congruent relation with each other hermetically sealing one end of said tubular member, gripping said tubular member adjacent its opposite end and suspending the same vertically into alignment with a heating element having a central opening therein of a diameter larger than the outside diameter of said tubular member and with the axis of said tubular member substantially coaxial with said opening, continually evacuating air and gasses from within said tubular member through said opposite end thereof while simultaneously progressively lowering the assembly of said fibers and tubular member endwise into said opening of said heating element while preventing engagement of said tubular member with said heating element and at such a controlled rate as to cause the portion of said assembly lying within said opening to be zone heated and softened to an extent wherein the tubular member and fibers as a whole become deformable and the vacuum within said tubular member will cause the same to collapse into intimate fused relation with said fibers thereby causing said fibers to assume intimately interfitting shapes and to fuse with each other and continuing said progressive lowering of said assembly into said opening throughout the major portion of its length from said initially sealed end thereof to continuously bring about said collapsing and fusing together of said tubular member and fibers while evacuating atmosphere and gasses from within said tubular member as said collapsing and fusing proceeds along the length of said assembly.

3. The method of making a fiber optical image transfer device comprising forming a tightly packed bundle of a plurality of relatively long and thin glass light conducting fibers having a relatively high index of refraction and each individually coated with glass of a relatively low index of refraction with said fibers placed in side-by-side substantially parallel congruent distributional arrangement and having corresponding opposite ends thereof substantially flush with each other, forcing said bundle of fibers endwise fully into a tight fitting open-ended glass tubular member substantially without disturbing the aligned and congruent relation of said fibers hermetically sealing one end of said tubular member, gripping said tubular member adjacent its opposite end and suspending the same vertically into alignment with a heating element having a central opening therein of a size larger than that of said tubular member and with the axis of said tubular member substantially coaxial with said opening, continually evacuating air and gases from within said tubular member through the opposite end thereof while simultaneously progressively lowering the assembly of said fibers and tubular member endwise at a substantially continuous uniform rate into said opening of said heating element while preventing engagement of said tubular member with the inner walls of said opening in said heating element, controlling the heating temperature of said element according to said rate at which said assembly is lowered to bring about softening of said tubular member and fibers substantially throughout the entire portion of said assembly lying within said opening at any one time and to cause said tubular member and fibers as a whole to become deformable in response to the pull of said vacuum so as to take on intimate interfitting cross-sectional shapes and become fused together throughout the heated area thereof, continuing said lowering and heating of said assembly throughout the major portion of the length thereof while simultaneously continuously drawing the same endwise as a unit from said initially heat sealed end at a rate greater than that of said lowering so as to attenuate said fibers and tubular member.

4. The method of making a fiber optical image transfer device comprising forming a tightly packed bundle of a plurality of long and thin glass light-conducting fibers placed in a side-by-side substantially parallel congruent distributional arrangement and with corresponding ends of said fibers in substantially flush relation with each other, forcing said bundle of fibers endwise into a tight fitting open-ended glass tubular member substantially without disturbing the aligned and congruent relation of said fibers closing and hermetically sealing one end of said tubular member below adjacent ends of said fibers gripping said tubular member adjacent its opposite end and suspending the same substantially coaxially with an annular heating element adapted to heat the materials of said tubular member and fibers to a temperature suitable for drawing and such as to bring about fusion thereof, continually evacuating air and gasses from within said tubular member through said opposite end thereof while simultaneously progressively lowering the assembly of said fibers and tubular member endwise through said heating element at a predetermined rate such as to cause the cross-sectional area of said portion of said assembly lying within said heating element to become zone heated and softened to an extent wherein the fibers as a whole and the tubular member thereof will be rendered deformable by the action of said vacuum within said tubular member and said vacuum will cause said tubular member to collapse upon said fibers causing the same to assume interfitting shapes and become fused to each other and to said tubular member, continuing said progressive lowering of said assembled fibers and tubular member at said predetermined rate into said heating element and drawing said heated assembly endwise as a unit from said initially sealed end thereof at a predetermined rate greater than that of said lowering to simultaneously attenuate said fibers and tubular member of said assembly.

5. The method of making a bundle of aligned transparent fiber members consisting of the steps of: longitudinally aligning a multiplicity of transparent rod members within the lumen of a transparent cylinder member, each of said rod members consisting of a transparent core coated with a transparent material characterized by a lower index of refraction than such index of said core, all such members and coating material being selected so as to have substantially the same melting temperature and coefficient of thermal expansion, and heating such combination to a temperature above the softening point thereof while drawing such combination to concurrently lengthen and reduce the diameter of said rod members into fibers and cause the material forming such cylinder member to flow inwardly into intimate relation therewith.

6. The method of making a bundle of aligned transparent fiber members consisting of the steps of: longitudinally aligning a multiplicity of transparent rod members within the lumen of a transparent cylinder member, each of said rod members consisting of a transparent core coated with a transparent material characterized by a lower index of refraction than such index of said core, said cylinder member likewise being characterized by a lower index of refraction than such index of said core, all such members and coating material being selected so as to have substantially the same melting temperature and coefficient of thermal expansion, and heating such combination to a temperature above the softening point thereof while drawing such combination to concurrently lengthen and reduce the diameter of said rod members into fibers and cause the material forming such cylinder member to flow inwardly into intimate relation therewith.

7. The method of making a bundle of aligned optically transparent fibers consisting of the steps of: longitudinally aligning a multiplicity of glass rod members within the lumen of a glass cylinder, each of said glass rod members consisting of an optically transparent glass core coated with a glass of a lower index of refraction than such index of said core, said rod and cylinder members and coating material being selected so as to have substantially the same melting temperature and coefficients of thermal expansion, and heating such combination to a temperature above the softening point thereof while drawing such combination to concurrently lengthen and reduce the diameter of said glass rod members into fibers while causing the glass of said cylinder to flow inwardly into intimate relation therewith.

8. The method of making a bundle of aligned optically transparent fibers consisting of the steps of: longitudinally aligning a multiplicity of glass rod members within the lumen of a glass cylinder, each of said glass rod members consisting of an optically transparent glass core coated with a glass of a lower index of refraction than such index of said core, such combination being further characterized by the glass cylinder being of lower refractive index than such index of said core members, said rods, coating and cylinder being selected so as to have substantially the same melting temperature and coefficients of thermal expansion, and heating such combination to a temperature above the softening point thereof while drawing such combination to concurrently lengthen and reduce the diameter of said glass rod members into fibers while causing the glass of said cylinders to flow inwardly into intimate relation therewith.

References Cited in the file of this patent

UNITED STATES PATENTS

| | | |
|---|---|---|
| 1,899,146 | Gross | Feb. 28, 1933 |
| 2,311,704 | Simison | Feb. 23, 1943 |
| 2,433,271 | Grant | Dec. 23, 1947 |
| 2,484,003 | Simison | Oct. 4, 1949 |
| 2,608,722 | Stuetzer | Sept. 2, 1952 |
| 2,652,660 | Kurz | Sept. 22, 1953 |
| 2,752,731 | Altosaar | July 3, 1956 |
| 2,825,260 | O'Brien | Mar. 4, 1958 |
| 2,980,957 | Hicks | Apr. 25, 1961 |
| 3,037,241 | Bazinet et al. | June 5, 1962 |

FOREIGN PATENTS

| | | |
|---|---|---|
| 160,168 | Great Britain | Aug. 4, 1921 |